Dec. 29, 1959  H. KARNBACH  2,919,031
SUSPENSION FILING SYSTEM
Filed Jan. 24, 1956  2 Sheets-Sheet 1

INVENTOR
HUGO KARNBACH
BY Young, Emery & Thompson
ATTYS.

Dec. 29, 1959        H. KARNBACH        2,919,031
SUSPENSION FILING SYSTEM
Filed Jan. 24, 1956        2 Sheets-Sheet 2
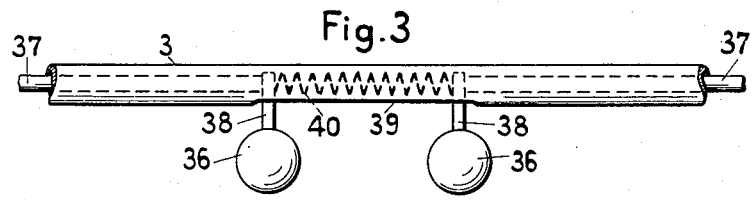
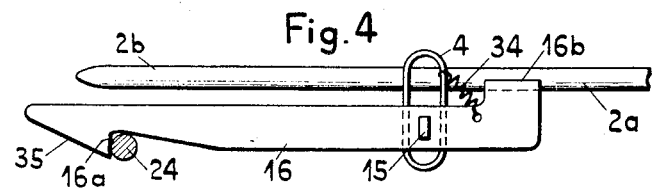
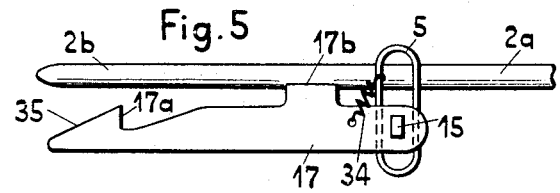
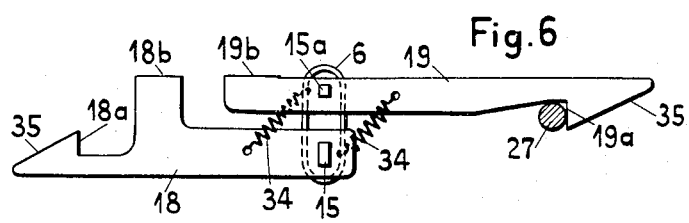
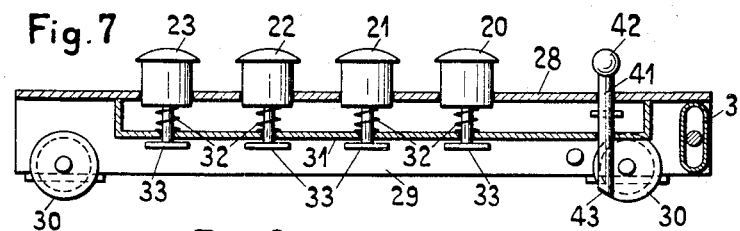
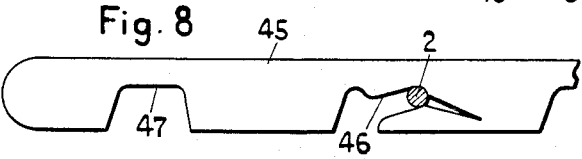
INVENTOR
HUGO KARNBACH
BY Young, Emery & Thompson
ATTYS.

United States Patent Office 2,919,031
Patented Dec. 29, 1959

2,919,031

SUSPENSION FILING SYSTEM

Hugo Karnbach, Kusnacht, Switzerland

Application January 24, 1956, Serial No. 561,089

Claims priority, application Switzerland January 28, 1955

7 Claims. (Cl. 211—46)

The invention relates to a system for suspension filing of plans, drawings and like sheets.

Systems of this type are known in which the objects can be suspended from at least two racks forming a compartment, the carrier pins of which are disposed in opposition and in staggered relationship to each other and extend over approximately the depth of the compartment, one of said racks being movable in at least one guide relatively to the other in the closed and open positions of the compartment.

In such a system, the present invention essentially comprises means by which the movable rack on being opened can be arrested and locked in an intermediate position, through which the compartment becomes widened, whereas for opening the compartment a release of the locking is necessary.

Further features of the invention will appear from the claims, the specification and the drawing, which latter represents by way of example one form of embodiment incorporating the invention.

Fig. 3 shows the service handles on a rack for actuation of the arresting and locking means;

Figs. 4, 5 and 6 illustrate various details relating to the mutual coupling of the racks;

Fig. 7 shows the arrangement of press-keys for releasing the couplings, together with a securing device, as seen from inside the frame, and Fig. 8 is a part-view of a securing bar.

Figure 1:
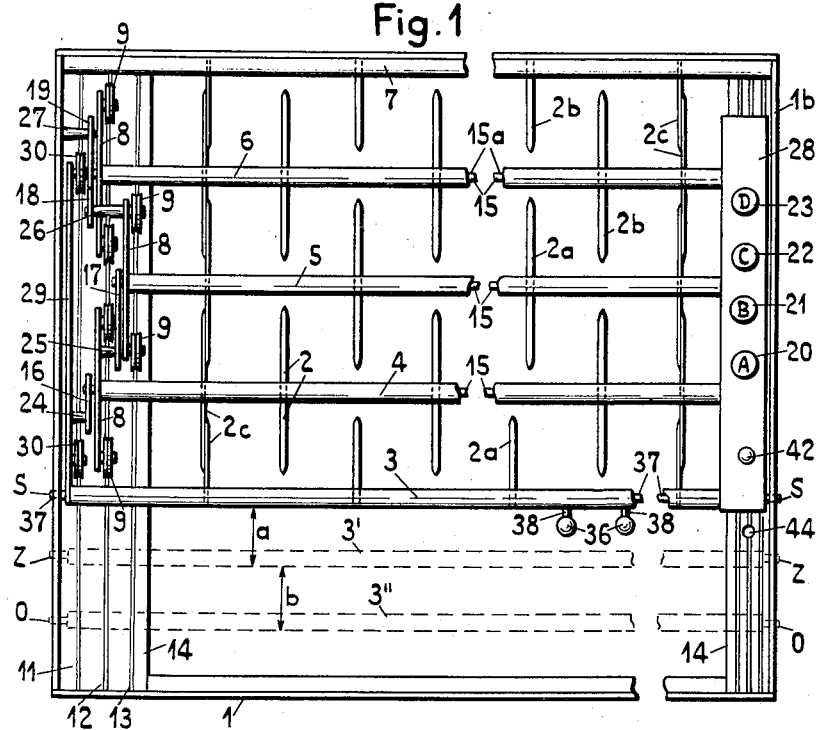
Fig. 1 is a top view of the system, where several groups of racks are combined in a frame to form a structural unit.

The system as illustrated in Fig. 1 comprises a rigid frame of four angle irons, wherein four parallel carriers 3, 4, 5, 6 are mounted parallel and slidable, with projecting carrier pins 2 distributed in spaced relation over the length thereof. The length of the pins limits the closing of adjacent carriers or racks and when so closed the carried objects are suspended on the pins 2a of one rack and 2b of the adjacent rack. Th carrier pins 2a and 2b are arranged in staggered relationship to each other, whereby the carrier pins projecting from both sides of the carriers 4, 5 and 6 are formed of a through-going iron pin. Accordingly, each of the racks 4, 5 and 6 between the foremost and the rearmost carriers serve as a divider of each of two neighboring compartments. The rearmost carrier 7 is formed by the rear spar of the frame 1 and has carrier pins 2b unilaterally only. The carriers 3–6 have at their ends lateral extensions 8 welded thereto, each carrying two runner rollers 9 with sunk running groove 10 rotatably mounted thereon. The lateral extensions 8 of the neighboring carriers are staggered in the longitudinal direction of the carriers, Fig. 1, and their rollers run on various ribs 11, 12, 13 formed on a broad horizontal flange 14 serving as a rail, each flange 14 forming a unit with a side spar of the frame 1. The extensions 8 are comparatively long and the runner rollers 9 are arranged at their ends so as to ensure satisfactory guiding.

The carriers are detachably coupled to each other, as will be explained hereinafter. Each of the carriers 4, 5, 6 is in the longitudinal direction passed through by a tie-rod 15 having at each extremity a coupling pawl 16, 17, 18 and 19 rigidly mounted thereon. Each pawl has a hook 16a–19a as well as a horizontally offset pressure plate 16b–19b each of which serves to release the coupling when actuated by means of one of the resilient press-keys 20, 21, 22 and 23, Figs. 1 and 7. Since each of the movable carriers 4, 5, 6 is coupled to the next one in front of it, and the rearmost of the movable carriers 6 is coupled to the frame 1, and since on the other hand the press-keys 20–23 are arranged in alignment for convenient operation on one side of the frame, the coupling pawls differ in design, as shown in Figs. 4–6. The hook 16a of the pawl 16 thereby engages behind a stop bolt 24 firmly connected to the flange 29, the hook 17a behind a stop 25 projecting on flange 8 of the carrier 4, the hook 18a behind a stop 26 projecting on a flange of carrier 5 and the hook 19a behind a stop bolt 27, Fig. 1, projecting on a side spar of the frame 1. The push-key 20 acts with the pressure plate 16b; key 21 with the pressure plate 17b; key 22 with the pressure plate 18b and key 23 with the plate 19b. The keys 20–23 are arranged on a horizontal flange 28 of a carriage carried by the foremost carrier 3, a cross flange 29 placed on edge and the pertinent runner rollers 30, and are guided by a parallel flange 31 and are each fitted with a compression coil spring 32. The pressure plates 33 ensure safe cooperation with the pressure pieces 16b–19b. In order to retain the coupling pawls 16–19 in their latched position, they are connected to the pertinent carriers by small tension springs 34; on the other hand they have lifting faces 35 on their hooks. The tie-rods 15 extend in the lower part of the related carriers, Figs. 4–6, while the carrier pins 2 pass through their upper part. Only the tie-rod 15a of the carrier 6 extends above the carrier pins thereof, Fig. 6, and has therefore a small cross-section. For the sake of clarity the pins 2 are omitted in Fig. 6. Through the tie-rods 15 the coupling or uncoupling movements are uniformly transmitted to the coupling members of the other side of the frame, thus preventing an oblique position of the carriers when in use.

By virtue of the described design the coupling members need only be pulled at the foremost carrier 3 in order to selectively open any compartment after the coupling has been released between the carriers enclosing the compartment by depressing the related key. The foremost carrier 3 is to that effect enlarged to form a carriage (as mentioned before) and has only carrier pins 2 on its rear side. At its front side it is provided with two preferably globular handles 36, lying, for instance, in the middle of the width of frame 1 and about 4–6 cm. apart. Said handles 36 serve both for pulling forward and pushing back the co-coupled carriers, as well as for operating the arresting and locking means. These means include two rods 37 slidably and axially guided in the foremost carrier 3 and forced apart by a spring 40, which rods protrude from the ends of the carrier 3 and are each connected to one of the handles 36 by means of an arm 38 within carrier 3. The arms 38 are guided for longitudinal displacement in a common slot 39 of carrier 3, Fig. 3. At the vertical flanges 1b of the side spars of frame 1, at three different points thereof, oppositely-disposed notches in the form of holes or depressions are symmetrically arranged, into which the two arresting and locking rods 37 fall by action of the spring 40 as soon as the rack 3 is displaced to the respective points, the carriage being each time arrested and locked at the frame 1. To allow of displacing the carriage from one position to another, the locking must therefore be released first from the holes by pressing the two handles 36 together against the power of the spring 40.

The three pairs of holes correspond to a closed position S, an intermediate position Z and an open position O of the carriage or of the carriers coupled thereto. In the closed position S, Fig. 1, the compartments formed between the carriers are closed, and the carrier pins 2a and 2b overlap each other so as to substantially extend over the whole length of the compartment between each two carriers or racks. On displacement of the rack 3 in the opening direction, i.e., forwards towards the manipulating person, a compartment becomes widened by the distance a, whereby the carrier 3 comes into the dotted line position 3', in which the pins 2a and 2b of the related compartment just overlap. In the open position the related compartment is entirely opened, i.e. between the ends of the pins 2a and 2b a free space will be left. Incidentally, the rack 3 has moved by a further distance b into position 3".

A securing bolt 41 is guided on the flange 28 connected to the foremost rack 3, and on the flange 31; it has at the top a button 42, Figs. 1 and 7. In the equilateral horizontal frame-flange 14, a hole 44 or a depression is formed at a suitable place, into which the securing bolt 41 falls by gravity upon reaching the intermediate position Z, thus arresting the carriage.

The coupling members, except the push-keys 20–23, as well as the roller bearings of the carriers and at least a part of the rails 11, 12, 13 are each covered by a horizontal flange. This is the flange 28 at the righthand side, Fig. 1; at the lefthand side this flange may be disposed on the carriage or on frame 1. The flange at the left is omitted in Fig. 1.

Figure 2:
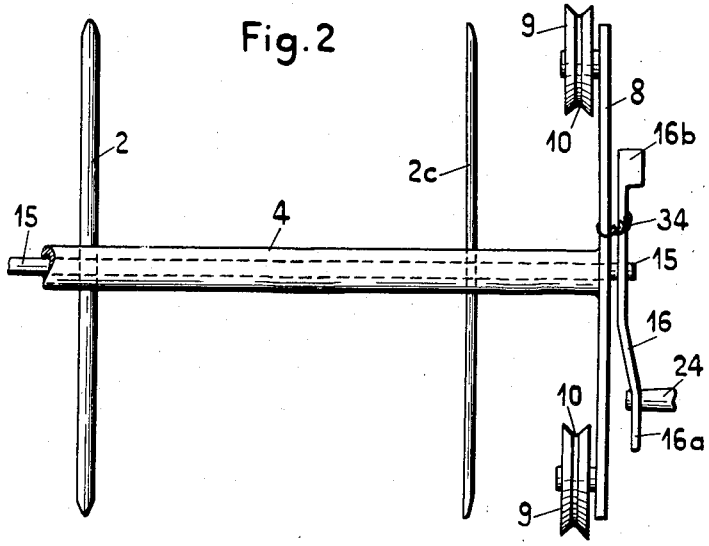
Fig. 2 shows one end of a rack or carrier with its runner rollers and some details.

The pins 2 are preferably tapered or pointed. To prevent bending over of the upper corners of the suspended objects with a slightly filled compartment due to great distances apart of the staggered pins, and to avoid the risk of damaging the objects by the outermost carrier pin when closing the compartment, the outermost pins 2c of each two carriers are so disposed as to lie against each other when the compartment is latched; they are vertically halved in the longitudinal direction so as to form the cross-sectional outline of a normal pin 2, Figs. 1 and 2.

To secure the filed objects from sliding off the carrier pins in the open position of the racks, provision is made for securing bars 45, Fig. 8, with recesses 46, 47 placeable on the pins. By means of the recesses 46 said bars are clamped on one pin row (2a), while the recesses 47 rest on the pins 2b of the opposite row.

The system as illustrated and disclosed is used in the following way:

If, for instance, a drawing filed between the racks 5 and 6 in a file nearly filling the compartment is to be removed, one depresses the related key 22, thus causing the carriage with the rack 3 and the racks 4 and 5 engaged therewith to uncouple from the frame, while rack 6 remains coupled. If then the handles 36 are pushed towards each other and simultaneously pulled out, the rack 3 becomes unlocked through the rods 37 and the carriage with the racks 3, 4 and 5 is rendered operative. If, upon unlocking, the lateral pressure on the handles 36 is stopped and they are only pulled, the rods 37 on reaching the intermediate position widening the compartment, will fall into the corresponding holes in the side flanges 1b so as to arrest and lock the carriage with the racks 3, 4 and 5 in this position. Incidentally, the respective compartment becomes widened, but is secured from opening. The required drawing or paper may then be conveniently sought in the enlarged and thus better accessible compartment, the drawings filed in front of the one sought being slid into one row of carrier pins and those behind it onto the other row of pins and preferably secured by means of a bar 45. When this drawing is found, it may be taken out by opening the compartment, by again pressing the handles 36 together and pulling the carriage with the racks 3, 4 and 5 forwards, in which position the pins 2a, 2b will leave a free interspace and allow the drawing to be lifted out.

Should, when pulling forwards the carriage from the closed position S, the handles 36 be pressed together too long, and the carriage unintentionally move over the intermediate position Z, before the drawings are held in the compartment by a clamping bar 45, the securing bolt 41 automatically arrests the carriage in the intermediate position. For further displacement into the open position, the securing bolt should therefore be released by lifting it out of engagement.

The closing of the opened compartment upon removal or filing of an object takes place by pressing the handles 36 together and pushing the carriage directly into the closed position.

In order to be able to push the carriage directly into the closed position without having to press the handles 36 together again upon release of the rods 37 incidental to restoring the carriage into the closed position of the racks, the securing bolt 41 at its lower end as well as the arresting rods 37 have a lifting face effective in the resetting direction, which for the bolt 41 is designated 43. Also suitable lifting faces may be provided at the hole 44 and in the reception holes of the flanges 1b for the rods 37.

The described system has the advantage of a great capacity with relatively small space required, inasmuch as for any desired number of compartments there will always be only one and the same opening depth $(a+b)$ which, moreover, lies within the rigid frame 1. As a result of the staggered arrangement of the carrier pins 2a and 2b, each compartment may be filled entirely, i.e. by utilizing to the utmost the interspace between two carriers; but, in spite of an intermediate position serving as preselecting position, there is provided ample space for searching for the desired object in the respective compartment without danger of the object sliding off the pins. As opposed to known similar systems, in which searching for and removing an object an additional appliance must be set up and brought into action with a suitable carrier, attending to the disclosed system is extremely simple and convenient. Any filed object, especially if marked by an ordinary signaling system, may be immediately and easily found in the respective widened compartment and removed subsequent to complete opening thereof.

Obviously any number of carriers or racks may be provided according to space available. The frame 1 may thereby be fastened on a rigid or movable standard or be also permanently or releasably attached to a draw-out frame of a cupboard, etc. For filing large quantities of suspended objects, several of the described systems may be combined in a cabinet or frame, provided that sufficient space is available for the objects of each frame to hang freely.

It is understood that the system allows of filing at the same time drawings, plans, etc. of various sizes, singly or mixed, if only the perforation in their margin corresponds to the pitch of the carrier pins. The perforations are preferably provided by sticking a perforated strip to the objects to be filed, thus stiffening them to a certain extent.

What I claim is:

1. A filing cabinet for retaining perforated documents, drawings and sheets in vertical suspension therein, comprising a guide frame, at least two tubular bars forming a compartment, the bars having pins mounted thereon to engage in the perforations in the documents and which are oppositely disposed and in staggered relationship relative to each other extending over approximately the depth of the compartment, guide rails, one of the bars being movable on the guide rails relative to the other from a closed position to an open position of the bars, the movable bar having two rods longitudinally slidably supported therein, a spring in the movable bar to keep the rods apart, a service handle connected to each rod with each of the ends being capable of projecting into a notch in the guide frame, said notches being each arranged in the sliding direction of the movable bar at one location of the guide frame, corresponding to the closed position, an intermediate position, and the open position, each bar being releasably connected to the next in front thereof by coupling members having spring-loaded pawls with lifting faces, pivotal at least at one end of the bars, and press keys provided so that the pawls are arranged for cooperation with resiliently mounted press-keys fitted on a rail operatively connected to the foremost bar, said rail being supported in the side member of the frame on the related guide of the bar.

2. A filing cabinet for retaining perforated documents, drawings and sheets in vertical suspension therein, comprising a guide frame, at least two tubular bars forming a compartment, the bars having pins mounted thereon to engage in the perforations in the documents and which are oppositely disposed and in staggered relationship relative to each other extending over approximately the depth of the compartment, guide rails, one of the bars being movable on the guide rails relative to the other from a closed position to an open position of the bars, the movable bar having two rods longitudinally slidably supported therein, a spring in the movable bar to keep the rods apart, a service handle connected to each rod with each of the ends being capable of projecting into a notch in the guide frame, said notches being each arranged in the sliding direction of the movable bar at one location of the guide frame, corresponding to the closed position, an intermediate position, and the open position, and the spring pawls at both ends of the bars being symmetrically arranged and pivotally connected by tie rods extending through the bars.

3. A filing cabinet for retaining perforated documents, drawings and sheets in vertical suspension therein, comprising a guide frame, at least two tubular bars forming a compartment, the bars having pins mounted thereon to engage in the perforations in the documents and which are oppositely disposed and in staggered relationship relative to each other extending over approximately the depth of the compartment, guide rails, one of the bars being movable on the guide rails relative to the other from a closed position to an open position of the bars, the movable bar having two rods longitudinally slidably supported therein, a spring in the movable bar to keep the rods apart, a service handle connected to each rod with each of the ends being capable of projecting into a notch in the guide frame, said notches being each arranged in the sliding direction of the movable bar at one location of the guide frame, corresponding to the closed position, an intermediate position, and the open position, each bar carrying at both ends two runner rollers located on opposite sides of a lateral extension thereof, the lateral extensions of adjacent bars being in staggered relationship to each other, and the pairs of rollers of the various bars running on guides provided therefor in the side members of the frame.

4. A filing cabinet for retaining perforated documents, drawings and sheets in vertical suspension therein, comprising a guide frame, at least two tubular bars forming a compartment, the bars having pins mounted thereon to engage in the perforations in the documents and which are oppositely disposed and in staggered relationship relative to each other extending over approximately the depth of the compartment, guide rails, one of the bars being movable on the guide rails relative to the other from a closed position to an open position of the bars, the movable bar having two rods longitudinally slidably supported therein, a spring in the movable bar to keep the rods apart, a service handle connected to each rod with each of the ends being capable of projecting into a notch in the guide frame, said notches being each arranged in the sliding direction of the movable bar at one location of the guide frame, corresponding to the closed position, an intermediate position, and the open position, a securing bolt provided connected to the foremost bar, which on pulling the bar forward, falls at least in the intermediate position into a notch on a frame member, and said securing bolt as well as the notch each being provided with a lifting face effective only in the resetting movement of the bar for the purpose of releasing the bar during the resetting movement from the open to the closed position.

5. A filing cabinet for retaining perforated documents, drawings and sheets in vertical suspension therein, comprising a guide frame, at least two tubular bars forming a compartment, the bars having pins mounted thereon to engage in the perforations in the documents and which are oppositely disposed and in staggered relationship relative to each other extending over approximately the depth of the compartment, guide rails, one of the bars being movable on the guide rails relative to the other from a closed position to an open position of the bars, the movable bar having two rods longitudinally slidably supported therein, a spring in the movable bar to keep the rods apart, a service handle connected to each rod with each of the ends being capable of projecting into a notch in the guide frame, said notches being each arranged in the sliding direction of the movable bar at one location of the guide frame, corresponding to the closed position, an intermediate position, and the open position, and the arresting and locking rods of the front movable bar as well as the notches being each provided with a lifting face effective only in the resetting movement of the bar for the purpose of releasing the arrested bar during the resetting movement from the open to the closed position.

6. A filing cabinet for retaining perforated documents, drawings and sheets in vertical suspension therein, comprising a guide frame, at least two tubular bars forming a compartment, the bars having pins mounted thereon to engage in the perforations in the documents and which are oppositely disposed and in staggered relationship relative to each other extending over approximately the depth of the compartment, guide rails, one of the bars being movable on the guide rails relative to the other from a closed position to an open position of the bars, the movable bar having two rods longitudinally slidably supported therein, a spring in the movable bar to keep the rods apart, a service handle connected to each rod with each of the ends being capable of projecting into a notch in the guide frame, said notches being each arranged in the sliding direction of the movable bar at one location of the guide frame, corresponding to the closed position, an intermediate position, and the open position, and the outermost carrier pins being provided for each two bars arranged laterally adjacent each other in the closed position and are vertically halved lengthwise so as to form together the cross-sectional outline of a normal carrier pin.

7. A filing cabinet for retaining perforated documents, drawings and sheets in vertical suspension therein, comprising a guide frame, a plurality of groups of series-arranged pairs of tubular bars combined as a structural unit and each two tubular bars forming a compartment, each bar having pins mounted thereon to engage in the perforations in the documents and which are oppositely disposed and in staggered relationship relative to each other extending over approximately the depth of a compartment, guide rails for the bars on said frame so that the bars will be movable on the guide rails for a closing position and an opening position of the bars, one movable bar having two rods longitudinally slidably supported therein, a spring in the last-mentioned bar to keep the two rods apart, a service handle connected to each rod with each of the ends being capable of projecting into a notch in the guide frame, said notches being each in the guide frame in the sliding direction of the last-mentioned bar to correspond to the closed position, an intermediate position, and the open position, means to releasably couple the bars to each other so that, for selectively opening one of the compartments, the foremost bar is moved in the opening direction, thereby carrying along the coupled bars located in front of the compartment to be opened, said structural unit being slidable parallel on the guide rails therein, and means for arresting and locking the unit on the frame and, upon selection of a definite compartment, said last-mentioned means uncoupling the selected compartment from the closed position so that the bars for the selected compartment being slidable to an intermediate position and then to the open position.

References Cited in the file of this patent

UNITED STATES PATENTS

| | | |
|---|---|---|
| 590,666 | Macrae | Sept. 28, 1897 |
| 997,965 | Cobb | July 18, 1911 |
| 1,416,661 | Barnhart | May 16, 1922 |
| 1,704,892 | Hardy | Mar. 12, 1929 |
| 2,101,034 | Meuche | Dec. 7, 1937 |
| 2,726,128 | Hazel | Dec. 6, 1955 |

FOREIGN PATENTS

| | | |
|---|---|---|
| 526,892 | Belgium | Mar. 31, 1954 |
| 739,956 | Great Britain | Nov. 2, 1955 |